Aug. 27, 1929.  A. G. L. FARDET  1,726,216
LOOM
Filed Jan. 10, 1929
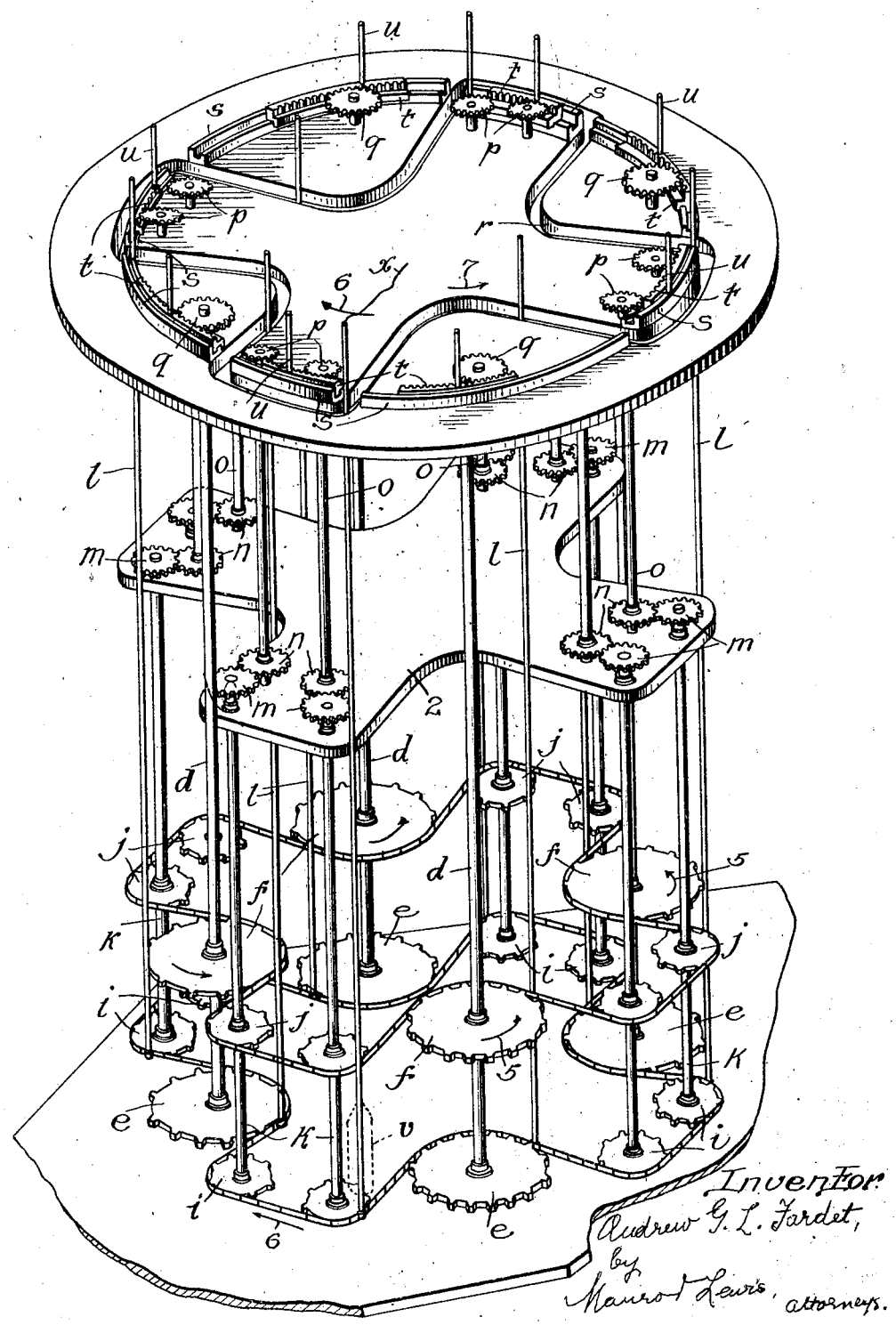

Patented Aug. 27, 1929.

1,726,216

UNITED STATES PATENT OFFICE.

ANDRÉ GEORGES LÉON FARDET, OF RUMILLY, FRANCE.

LOOM.

Application filed January 10, 1929, Serial No. 331,415, and in Germany December 24, 1927.

Thread-crossing in looms for making lacing, braiding, cordage and the like, has been heretofore obtained by driving the spindles by means of rotating plates which guide them along a sinuous line, part of the time in one direction and part of the time in the other direction.

Such a way of driving necessitates a mechanism which increases friction and consequently produces wear and, in addition, necessitates a rather considerable driving force accompanied by a great deal of noise.

My invention has for its principal object to produce a loom for making cordage, braiding, lacing and the like, in which the crossing of the threads of several sets of spindles is accomplished in such manner as to obviate the disadvantages mentioned above, and also to diminish the frequency of breakages of thread and to increase materially the speed of the spindles.

For the accomplishing of the above, and other objects, the loom constructed according to the present invention comprises two sets of spindles, one of which travels in a sinusoidal path continuously in one direction, and the other in a circular path continuously in the opposite direction; there being no reversal of the direction of movement of either set.

The guideway for the sinusoidal path is preferably in the form of a continuous slot in a suitable table or platform, the spindle-supports being in the form of vertical rods attached at regularly spaced intervals to an endless chain or belt which passes around gears, some of the shafts of which are at a greater distance than others from the common center of the two paths. By means of this arrangement the said endless chain or belt (in practice there are preferably two chains or belts that travel in unison) is caused to pursue a sinusoidal path in a horizontal plane.

The guideway for the circular path of the second set of spindles is discontinuous, the diameter of the path being such that the first mentioned path intersects it in each of its sinuosities, both as it approaches towards, and also as it recedes from, the common center. The circular guideway is preferably formed of a series of disconnected guiding elements, each having the configuration of the arc of a circle. Each of these guiding elements is positioned in one of the loops of the sinuous path, the breaks between adjacent elements being coincident with the intersections of the sinuous slot and being of sufficient length to admit the passage of the spindle carriers travelling in said slot. The circular guideway is also in a horizontal plane, but at a different level from that of the sinuous guideway.

By means of this disposition I am able to obtain perfect guiding of the spindles and I also obviate the disadvantages due to centrifugal force with the result that, the loom is able to produce an output heretofore unknown, such as on the order of the passing of six hundred spindles per minute and even higher.

Finally, the positioning of the grooves provided on the table allows the construction of the said table in two parts separated by the sinuous groove, which renders the mounting and assembly of the table and the loom very easy.

My invention will be more readily understood with reference to the accompanying drawing given by way of example and in which—

The single figure is a perspective view of one embodiment of my invention in connection with a sixteen spindle rope strand.

Referring to the drawing more in detail, the loom is provided with three superposed tables 1, 2 and 3.

On the table 1 are mounted the pinions $e$ whose shafts $d$ traverse the table 1 and are driven by any suitable driving means.

Chains $g$ and $h$ pass alternatively over the inner teeth of pinions $e$ and $f$ and over the outer teeth of pinions $i$ and $j$ and thus transmit the movement from one to the other.

Chains $g$ and $h$, the latter being directly above the former, travel in unison, and together they constitute a continuously travelling carrier for a set of vertical spindle-supporting rods $l$ which are attached thereto at regularly spaced intervals. The disposition of the pinions $e$, $f$, $i$, $j$ is such that chains $g$, $h$ form, when viewed from above, an endless figure of sinusoidal shape, and hence rods $l$ and the spindles carried by them, one of which is indicated by the dot and dash line $v$, travel in an endless sinuous path.

Above the said pinions is located the table 2, the edge of which conforms to the path formed by the endless chains $g$, $h$, so that the rods $l$ in their travel move in contact with, or in close proximity to, the edge of said table. Shafts $k$, on which the said pinions $i$ are mounted, pass through table 2 and have each on its upper end a pinion $m$, each of which meshes with a pinion $n$ keyed on a shaft $o$. Shafts $o$, which rotate in the opposite direction to shafts $k$, pass through the uppermost table 3, and carry each on its upper end a pinion $q$. Pinions $q$ are of larger diameter than pinions $p$.

Table 3 has a continuous cut-out endless slotway $r$, which conforms to the outline of chains $g$, $h$ and hence to the path travelled by the rods $l$. The latter extend through said slot $r$, which thus forms a guide for said rods. Rods $l$ are hollow for the passage of the thread which enters by a hole $w$ just above the spindle $v$ and issues at the upper end of the rod as shown at $x$.

It will be seen that table 3 is in two parts, which are entirely separated the one from the other by the endless slot or guideway $r$, the inner part being of the same configuration as table 2.

The circular race for the second set of spindles is formed by the disconnected elements $s$, each having the configuration of an arc of a circle, and the several elements being so positioned on table 3 as to form the outline of a circle whose center is coincident with that of the sinuous slot $r$, and whose diameter is such that its circumference is intersected by the successive loops of said slot.

The elements $s$ are grooved to form guideways for the slide blocks $t$, these being of segmental form and toothed on the inner side for engagement with the pinions $p$, $q$. On each slide block $t$ is mounted a vertical rod $u$, the rods $u$ serving as the carriers for the second set of cop-spindles.

From the foregoing it will be obvious that the pinions $e$ and $f$ turning in the direction of the arrows 5 drive the chains $g$ $h$ and with them the spindle carrying rods $l$ in the direction of the arrows 6.

But the pinions $p$ and $q$ turning in the direction of the arrows 5 communicate to the slide blocks $t$ and their cop-spindles $u$, a movement in the direction of the arrows 7, opposite to the direction of movement of rods $l$. It results that the cop-spindle carrying rods $l$ and $u$ each of which follows uniformly their course in one direction, cross their threads at the intersections of the races which they follow, with modification of their direction of movement.

The number of teeth of the pinions is calculated in such wise that the slide block $t$ will always be in engagement with one of the pinions $p$ $q$ and so that a cop mounted on a spindle $l$ will pass over the brake in the guide way in the interval included between the passing of successive slide blocks $t$.

While I have described what I deem to be the preferred form of my device I do not wish to be limited thereto as there might be many changes made in the form, construction and disposition of the parts without departing from the spirit of my invention, in so far as the said changes do not depart from the scope of the appended claims.

Having described my invention what I claim as new and desire to secure by Letters Patent of the United States of America is:

1. In a loom of the type described the combination of a series of spindles, means for guiding said spindles along a continuous sinuous path, a second series of spindles, means for guiding said second series of spindles along a circular path, said means being so disposed that the center of said paths coincide, means for moving said first mentioned series of spindles in one direction along said sinuous path, and means for moving said second series of spindles in a direction opposite to said first mentioned spindles.

2. In a loom of the type described the combination of a table, a continuous sinuous slotway formed in said table, a series of spindles disposed in said slotway, a second series of spindles, means for guiding said second series of spindles along a circular path, said means being so disposed that the center thereof coincides with that of said slotway, means for moving said first mentioned series of spindles in one direction along said slotway, and means for moving said second series of spindles in a direction opposite to said first mentioned spindles.

3. In a loom of the type described the combination of a series of spindles, means for guiding said spindle along a continuous sinuous path, a second series of spindles, a series of segmental circular guides disposed on said table between the loops of said slotway adapted to receive said second spindles, the center of said circular guides coinciding with the center of said sinuous path, means for moving said first mentioned series of spindles along said slotway in one direction, and means for moving said second series of spindles in a direction opposite to said first mentioned spindles.

4. In a loom of the type described the combination of a table, a continuous sinuous slotway formed in said table, a series of spindles disposed in said slotway, a second series of spindles, a series of segmental circular guides disposed on said table between the loops of said slotway adapted to receive said second spindles, the center of said circular guides coinciding with the center of said sinuous path, means for moving said first mentioned series of spindles along said slotway in one direction, and means for moving said second series of spindles in a direction opposite to said first mentioned spindles.

5. In a loom of the type described the combination of a series of spindles, means for guiding said spindles along a continuous sinuous path, a second series of spindles, a series of segmental circular slide blocks for supporting said second spindles, a series of corresponding circular guides for supporting said slideblocks, said guides being disposed on said table between the loops of said sinuous path with the center of said circular guides coinciding with said sinuous path, means for moving said first mentioned series of spindles along said slotway in one direction, and means for continually moving said slide blocks in a direction opposite to said first mentioned spindles.

6. In a loom of the type described the combination of a table, a continuous sinuous slotway formed in said table, a series of spindles disposed in said slotway, a second series of spindles, a series of segmental circular slide blocks for supporting said second spindles, a series of corresponding circular guides for supporting said slideblocks, said guides being disposed on said table between the loops of said sinuous path with the center of said circular guides coinciding with said sinuous path, means for moving said first mentioned series of spindles along said slotway in one direction, and means for continually moving said slide blocks in a direction opposite to said first mentioned spindles.

7. In a loom of the type described the combination of a series of spindles, means for guiding said spindles along a continuous sinuous path, a second series of spindles, a series of segmental circular slide blocks for supporting said second spindles, a series of corresponding circular guides for supporting said slideblocks, said guides being disposed on said table between the loops of said sinuous path with the center of said circular guides coinciding with said sinuous path, means for moving said first mentioned series of spindles along said slotway in one direction, a toothed rack formed on the inner edge of each of said slide blocks, and a series of pinions adapted to move said racks continuously in a direction opposite to said first mentioned spindles.

8. In a loom of the type described the combination of a table, a continuous sinuous slotway formed in said table, a series of spindles disposed in said slotway, a second series of spindles, a series of segmental circular slide blocks for supporting said second spindles, a series of corresponding circular guides for supporting said slide blocks, said guides being disposed on said table between the loops of said sinuous slotway with the center of said circular guides coinciding with said sinuous path, means for moving said first mentioned spindles along said slotway in one direction, a toothed rack formed on the inner edge of each of said slide blocks, and a series of pinions adapted to move said racks continuously in a direction opposite to said first mentioned spindles.

In testimony whereof I have signed this specification.

ANDRÉ GEORGES LÉON FARDET.